United States Patent [19]

Hamada et al.

[11] Patent Number: 4,610,598
[45] Date of Patent: Sep. 9, 1986

[54] INDUSTRIAL ROBOT

[75] Inventors: Toyohide Hamada, Yokohama; Kouichi Sugimoto, Kanagawa; Hitoshi Kusakawa; Tatenori Jinriki, both of Chiba; Kiyohide Koizumi, Tokyo, all of Japan

[73] Assignee: Hitachi, Ltd., Tokyo, Japan

[21] Appl. No.: 527,863

[22] Filed: Aug. 30, 1983

[30] Foreign Application Priority Data

Aug. 30, 1982 [JP] Japan ................... 57-149320
Aug. 30, 1982 [JP] Japan ................... 57-149321
Aug. 30, 1982 [JP] Japan ................... 57-149322
Sep. 6, 1982 [JP] Japan ................... 57-153892

[51] Int. Cl.$^4$ .................................. B25J 18/00
[52] U.S. Cl. ............................ 411/744 A; 901/15; 901/21; 901/25; 901/28
[58] Field of Search ............... 414/744 R, 744 A, 719, 414/589, 590; 901/14, 15, 48, 23–26, 38, 16, 21, 28, 30, 36; 474/101

[56] References Cited

U.S. PATENT DOCUMENTS 3,948,114  4/1976  Koinzan ........................... 474/101
3,986,007  10/1976 Ruoff, Jr. ......................... 901/9 X
4,428,710  1/1984  Grisebach et al. ......... 414/744 A X
4,502,830  3/1985  Inaba et al. ................ 414/744 R X

FOREIGN PATENT DOCUMENTS 2330393  1/1975  Fed. Rep. of Germany ........ 901/15
0154342  3/1982  Fed. Rep. of Germany ... 414/744 A
112789   8/1980  Japan .
62778    5/1981  Japan .

OTHER PUBLICATIONS

Pica-Scara, Nitto, 6 pages.
Puha, Pentel, 4 pages.
Arm-Base, Hirata, 6 pages.

Primary Examiner—Donald W. Underwood
Attorney, Agent, or Firm—Beall Law Offices

[57] ABSTRACT

An industrial robot comprising: a base; a stand rigidly erected on the base; a shoulder securely mounted on the stand; a first arm consisting of upper and lower levers with the base portion pivoted to the shoulder so that the arm can be turned about a first vertical axis; a second arm having its one end pivoted to the other end of the first arm between the upper and lower levers so that the second arm can be turned about a second vertical axis; a vertically movable shaft so supported by the second arm as to allow the linear movement of the shaft along a third vertical axis; a rack parallel to the vertically movable shaft; a guide means for guiding the rack relative to the second arm in only the vertical direction; a coupling means for connecting the vertically movable shaft and the rack at their both ends; a first drive means secured to the shoulder to rotate, through a first power transmission means, the first arm about the first vertical axis; a second drive means secured to the shoulder to rotate, through a second power transmission means, the second arm about the second vertical axis; and a third drive means secured to the second arm to drive the rack in vertical direction through a third power transmission means.

37 Claims, 12 Drawing Figures

INDUSTRIAL ROBOT

BACKGROUND OF THE INVENTION

The present invention relates to an industrial robot and more particularly to that suitable for carrying out assembling and transportation of material in the manufacturing process.

In recent years a growing number of industrial robots are being developed and put into service. Many of these industrial robots have very small work ranges, so that the entire process is divided into a number of smaller work elements, each being assigned to respective industrial robots. This facilitates the control of the robots and improves the tact time.

Since the large number of robots must be installed, the industrial robot is first required to be small in size and light in weight, as well as inexpensive. Further, to reduce the tact time the industrial robot must be able to move at high speed.

Figure 1:
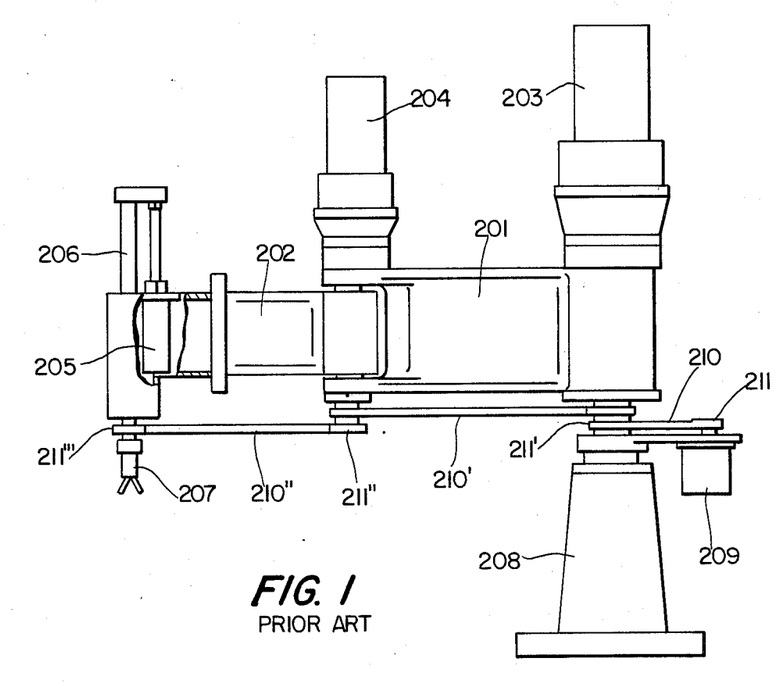
FIGS. 1 and 2 are front views of the conventional industrial robot of two-joint type.

One example of a conventional industrial robot is shown in FIG. 1.

This robot has a first arm 201 and a second arm 202 supported horizontally by two joints. At the base of the first arm 201 is provided a DC servomotor 203 to directly drive the first arm 201. A similar DC servomotor 204 is provided to the base of the second arm 202 pivoted at the front end of the first arm 201 so as to directly drive the second arm 202.

Provided at the front end of the second arm 202 is an air cylinder 205. A vertically moving shaft 206 is mounted to the end of the piston rod of the air cylinder 205 with a hand 207 pivotally supported at the lower end of the shaft 206.

The hand 207 is moved up and down by the extension and contraction of the air cylinder 205. A stepping motor 209 is secured to the base 208 to transmit the rotating force to the hand 207 through timing belts 210, 210', 210" and pulleys 211, 211', 211", 211''' to cause the hand 207 to perform twisting actions.

The above robot has a total of four degrees of freedom, i.e., two degrees of freedom in the horizontal plane defined by the first and second arms 201, 202, one degree of freedom in the vertical direction, and one degree of freedom given by the rotation of hand 207. They are used in assembling parts from above.

SUMMARY OF THE INVENTION

This invention has been accomplished with the view to overcoming the aforementioned drawbacks and its primary object is to provide an industrial robot which is inexpensive and small in size and light in weight.

Another object of this invention is to provide an industrial robot which has the moment of inertia of the rotating parts reduced so that the rotating components can be driven at high speed by a motor of small capacity and which has its entire height lowered so as to reduce the space it occupies.

Still another object of this invention is to provide an industrial robot which has high maintainability and safety and is easily switchable from three degrees of freedom to four degrees of freedom.

Further object of this invention is to provide an industrial robot which is capable of stopping the vertical movement of the hand at any desired position with high accuracy.

To achieve the above objectives, the present invention has the first arm divided into first and second parts with a power transmission means located between them to lower the robot height and thereby reduce the space occupied by the robot.

Another feature of this invention is that a third drive means to drive the vertically moving shaft is located at the rear of the second arm and at the middle portion of the first arm to keep the balance of rotating motion so as to minimize the size of the robot.

Further this invention features the construction in which the motor to give a rotating motion to the hand is provided on the base with the motor rotation transmitted to the hand rotating shaft via the chain sprocket and also features the chain tension adjusting mechanism provided to the hand rotation mechanism.

Further this invention features the construction in which a pocket is provided to the shoulder to accommodate a part of the first arm with the second vertical shaft axis of the first arm positioned on the side of the stand with respect to the first vertical shaft axis, thus reducing the volume of the robot and facilitating the transportation.

Furthermore, this invention is characterized in that the rotation of the motor installed at the rear of the second arm rotating shaft is conveyed to the front end of the second arm where a means is provided to convert the rotating movement to the linear movement thereby vertically reciprocating the tool holder shaft.

DESCRIPTION OF THE PREFERRED EMBODIMENT

The abovementioned conventional robot has the following drawbacks.

Since the vertical movement of the hand 207 is obtained by the air cylinder, accurate positioning of the hand in the vertical direction at a desired position cannot be obtained. Using mechanical stoppers, it is possible to set the accurate stop position at the vertical stroke ends. But when it is desired to change the stop position, the stopper positions must also be changed. Therefore the provision of mechanical stoppers cannot quickly cope with the change in action pattern.

Further drawback is that the rotary motion transmission mechanism components, i.e., timing belts 210, 210', 210" which provide the fourth degree of freedom are difficult to assemble and maintain. The timing belts 210, 210', 210" are endless loop components, so when one degree of freedom is to be added optionally to the hand of the robot having three degrees of freedom or when the timing belts are to be replaced, the rotating shaft of the first arm 201 must be disassembled before assembling the timing belts 210 210'.

Another drawback is that the moving engagement components, i.e., mechanism of the timing belts 210, 210', 210" and pulleys 211, 211', 211", 211''' are exposed. This is dangerous to humans and also leaves the undesired possibility of dust attaching to the engagement parts.

In addition, since the servomotor for the second arm is installed at the end of the first arm, the load on the servomotor of the first arm is large. To ensure swift rotating action of the first arm, the motor capacity of the first arm must be increased.

Figure 2:
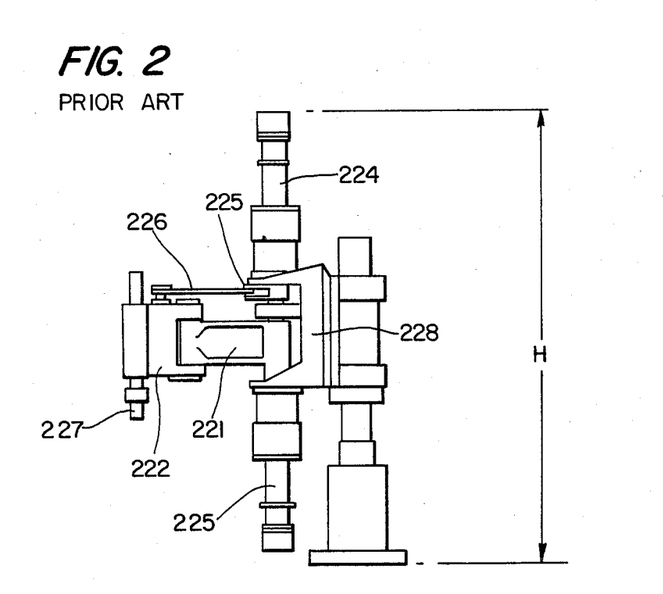

Another construction is available which uses a link mechanism in which, as shown in FIG. 2, the motor 224 of the second arm 222 is shifted from the end of the first arm 221 to the base 228, and the second arm 222 and its drive motor 224 are linked by a crank 225 and a connecting rod 226. The motor 223 of the first arm 221 is mounted on the base 228, and the hand 227 is supported at the end of the second arm 222.

However, since the connecting rod 226 is installed outside the first and second arms 221, 222, the vertical dimension of the base 228 becomes large, increasing the overall height H of the robot and therefore the space occupied by the robot.

Another disadvantage of the second construction is that the link mechanism consisting of connecting rod 226 and crank 225 is installed where it is easily accessible and therefore is dangerous. With this construction dust can easily attach to the moving parts.

Referring to the attached drawings, one embodiment of this invention will be explained in the following.

Figure 3:
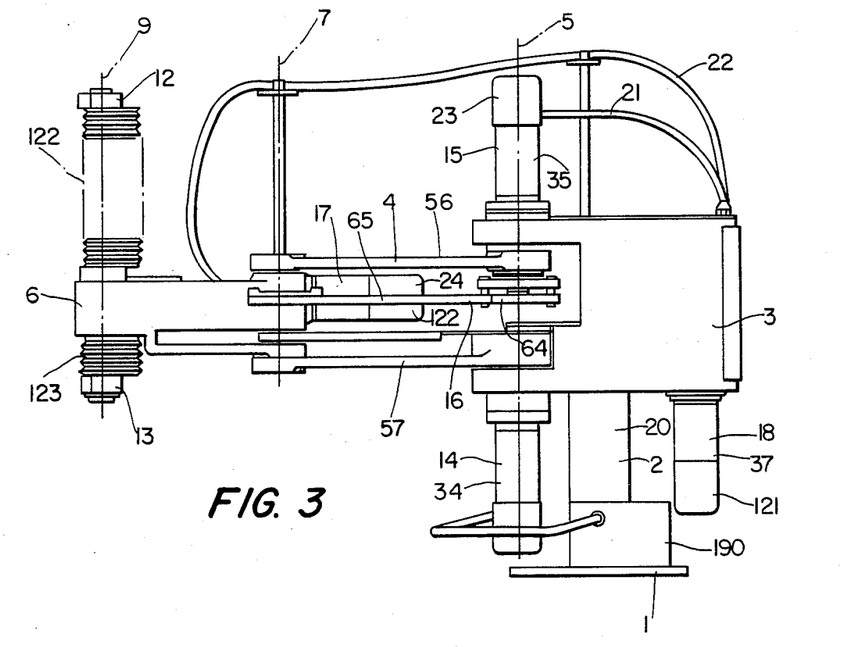
FIG. 3 is a front view of the industrial robot embodying the present invention.

First, the overall construction is explained with reference to FIG. 3. A stand 2 is securely erected on a base 1, and a shoulder 3 is fixed on the stand 2.

A first arm 4 is rotatably pivoted on the first vertical axis 5 of the shoulder 3 so that it can be rotated with respect to the shoulder 3. A second arm 6 is rotatably pivoted on the second vertical axis 7 of the first arm 4 so that it can be rotated with respect to the first arm 4. A vertically movable shaft 8 (see FIGS. 8 and 9) can be rotated about and moved vertically along the third vertical axis 9 of the second arm 6. A rack 10 (see FIGS. 8 and 9) is parallel to the vertically movable shaft 8. A guiding means 11 guides the rack 10 vertically relative to the second arm 6. The vertically movable shaft 8 is coupled to the rack 10 at the upper and lower ends by a connecting means 12, 13 so that the shaft 8 can be rotated relative to the rack 10.

A first drive means 14 rotates the first arm about the first vertical axis 5 through the first power transmission means. A second drive means 15 drives the second arm around the second vertical axis 7 through the second power transmission means 16. The first and second drive means 14, 15 are secured to the shoulder 3. A third drive means 17 is mounted to the second arm 6 to drive the rack 10 vertically through the third power transmission means 78 (see FIGS. 8 and 9). A fourth drive means 18 rotates, through the fourth power transmission means 19, the vertically movable shaft 8 about the third vertical axis 9 with respect to the second arm.

Detail of each component is explained in the following.

The base 1 is shaped flat like a plate. The stand 2 consists of a terminal block container 190 on the base and a hollow cylinder 20 mounted on the container 190. Through this hollow cylinder flexible multi-core insulated cables 21, 22 pass. Some of the flexible multi-core insulated cables are power lines to the second and third drive means 15, 17 and some are signal lines of position detectors 23, 24 to detect the position of the second and third drive means 15, 17.

Figure 4:
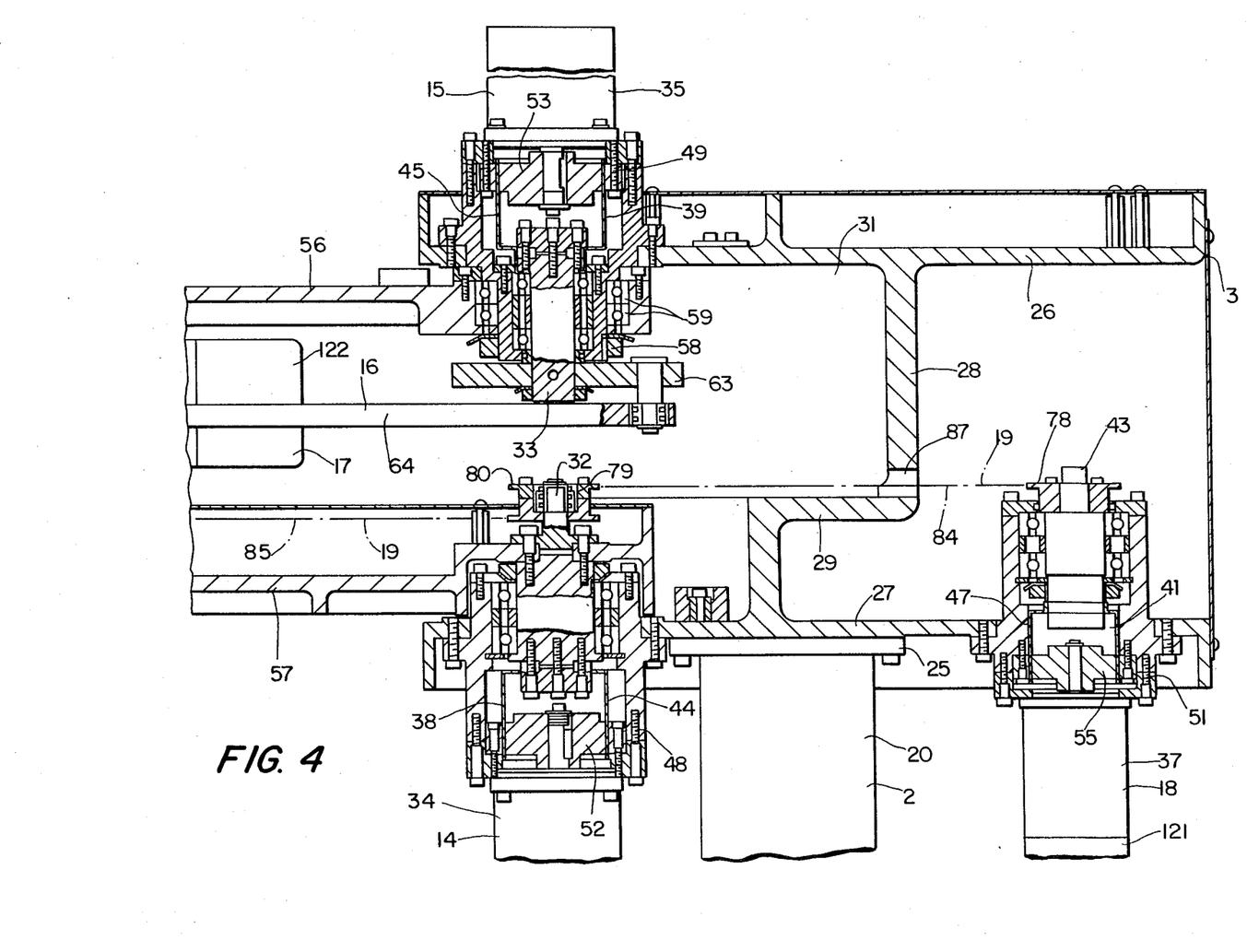
FIG. 4 is a partial cross-sectional view of the rear portion of the industrial robot as shown in FIG. 3.
Figure 5:
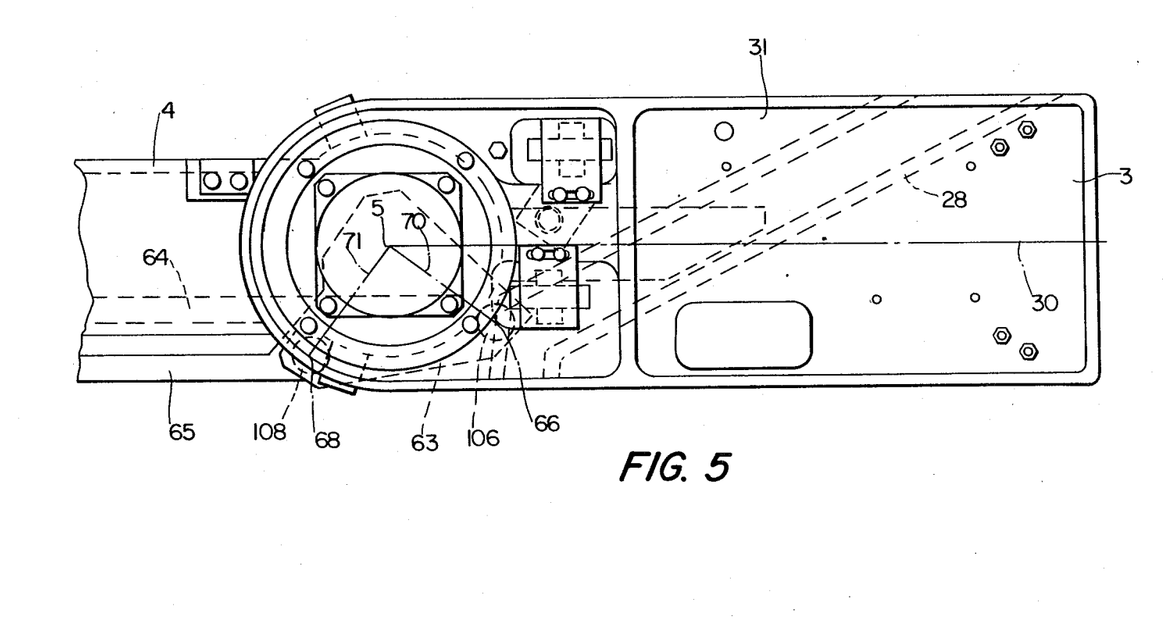
FIG. 5 is a partial plan view of the rear portion of the industrial robot as shown in FIG. 3.
Figure 10:
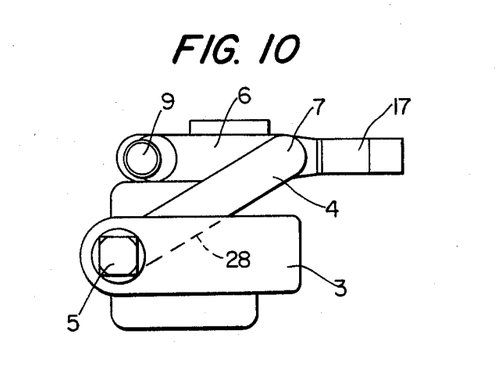
FIG. 10 is a plan view showing the industrial robot of this invention with the first and second arms folded.

The shoulder 3, as shown in FIG. 4, is secured to the flange 25 by screws at the upper end of the hollow cylinder 20. The shoulder 3 is formed of a ceiling 26, a bottom 27 and a connecting wall 28 which connects the ceiling and the bottom. The ceiling 26 and the bottom 27 are parallel to each other. The connecting wall 28, as shown in FIG. 4, has a step 29 and, as shown in FIG. 5, is inclined relative to the center line 30 of the shoulder 3 passing through the first vertical axis 5. A pocket 31 is located on the side of the first vertical axis 5 with respect to the connecting wall 28. As shown in FIG. 10, the first arm 4 can be rotated about the first vertical axis 5 until it contacts the connecting wall 28. Since the connecting wall is inclined relative to the center line of the shoulder which passes through the first vertical axis, the entire equipment can be folded to reduce its volume as shown in FIG. 10, which is advantageous in transportation and packing.

At the bottom 27 of the shoulder 3 are secured the fixing portions of the first and fourth drive means 14, 18 with the connecting wall 28 located between them. The fixing portion of the second drive means 15 is secured to the ceiling 26. The first and second drive means 14, 15 are installed so that the output shafts 32, 33 of the speed reduction devices 38, 39 coincide with the first vertical axis 5.

The first, second and fourth drive means 14, 15, 18 have motors 34, 35, 37 and speed reduction devices 38, 39, 41. The speed reduction devices 38, 39, 41 consist of flexible cup gears 44, 45, 47 secured to the speed reduction device output shafts 32, 33, 43; fixed sun gears 48, 49, 51 with the number of teeth slightly larger than the flexible cup gears and located outside the cup gears; and oval rotors 52, 53, 55 placed in contact with the internal surface of the flexible cup gears to be driven by the motors 34, 35, 37 to successively change the deforming position of the flexible cup gears.

The first arm 4 consists of upper and lower levers 56, 57, the lower lever 57 being secured to the output shaft 32 of the first drive means 14.

The upper lever 56 is rotatably supported on the vertical cylinder portion 58 of the shoulder 3 by the bearing 59 so that it can be rotated about the shaft of the first vertical axis 5.

The upper and lower levers 56 and 57 are connected on the second vertical axis 7 by a pin 60 so that the distance between them is constant.

The second arm 6 is supported by the upper and lower levers 56, 57 through the bearings 61, 62 so that it can be turned about the second vertical axis 7.

Since the first arm 4 is divided in two, it is possible to accommodate the power transmission mechanism such as link mechanism into the first arm 4. This not only makes the size of the robot small but also prevents human access to the mechanism to prevent hazard.

Since the third drive means can be installed on the side opposite to the vertically movable shaft with respect to the second vertical axis and far from the second vertical axis, it is possible to make nearly equal the rotating moment of the second arm at both ends of the second vertical axis. This in turn enables reduction in volume of the second drive means.

As shown in FIG. 10, the second arm 6 is so constructed that many parts can be contained between the upper and lower levers 56, 57.

Figure 6:
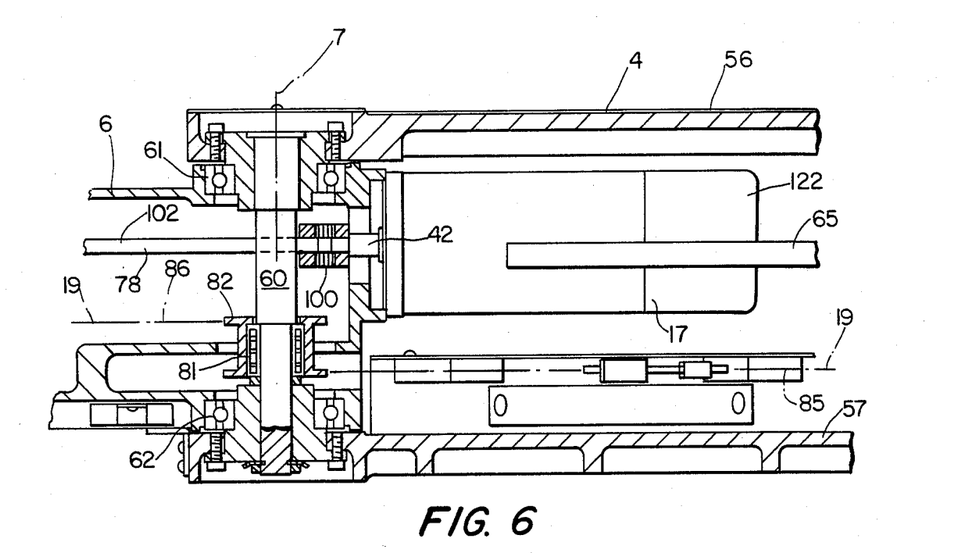
FIG. 6 is a partial cross-sectional view of the intermediate portion of the industrial robot as shown in FIG. 3.
Figure 7:
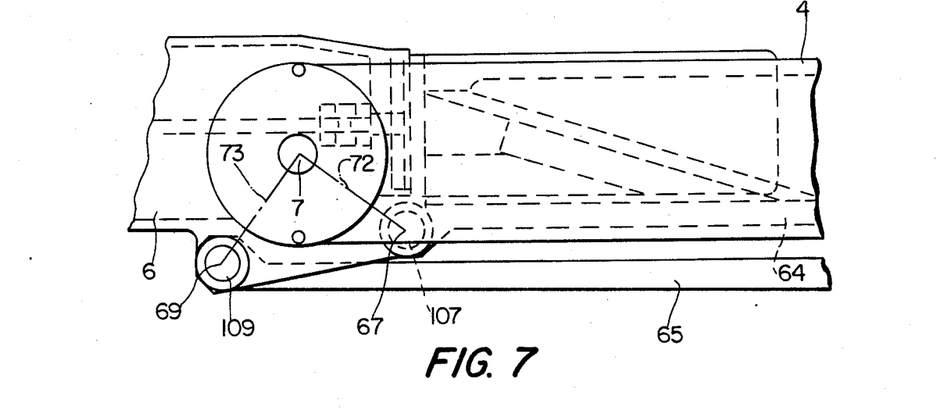
FIG. 7 is a partial plan view of the intermediate portion of the industrial robot as shown in FIG. 3.

The second power transmission means 16 to convey the power of the second drive means 15 to the second arm 6 consists of a crank plate 63 secured to the output shaft 33, two levers 64, 65 connecting the crank plate 63 and the second arm 6 and connecting pins 106 through 109. The distances from the crank plate 63 of the two levers 64, 65 to the pivot points 66 through 69 of the second arm 6 are equal. Let the line connecting 66 and 5 be a line 70, the line connecting 68 and 5 be a line 71, the line connecting 67 and 7 be a line 72 and the line connecting 69 and 7 be a line 73. Then the angle formed by the lines 70 and 71 is equal to the angle formed by the lines 72 and 73. The lines 70 through 73 are equal in length.

Further, when the first, second and third vertical axes 5, 7, 9 are almost in line and when the second vertical axis 7 is located between the first and third vertical axes, the pivoting points 66 through 69 are shifted greatly toward one side of the first arm 4.

Since in this way the second power transmission means for driving the second arm 6 is formed as a double link mechanism, it is possible to turn the second arm 6 by a large angle of more than 180 degrees with respect to the first arm 4 thus widening the work range of the robot.

Figure 8:
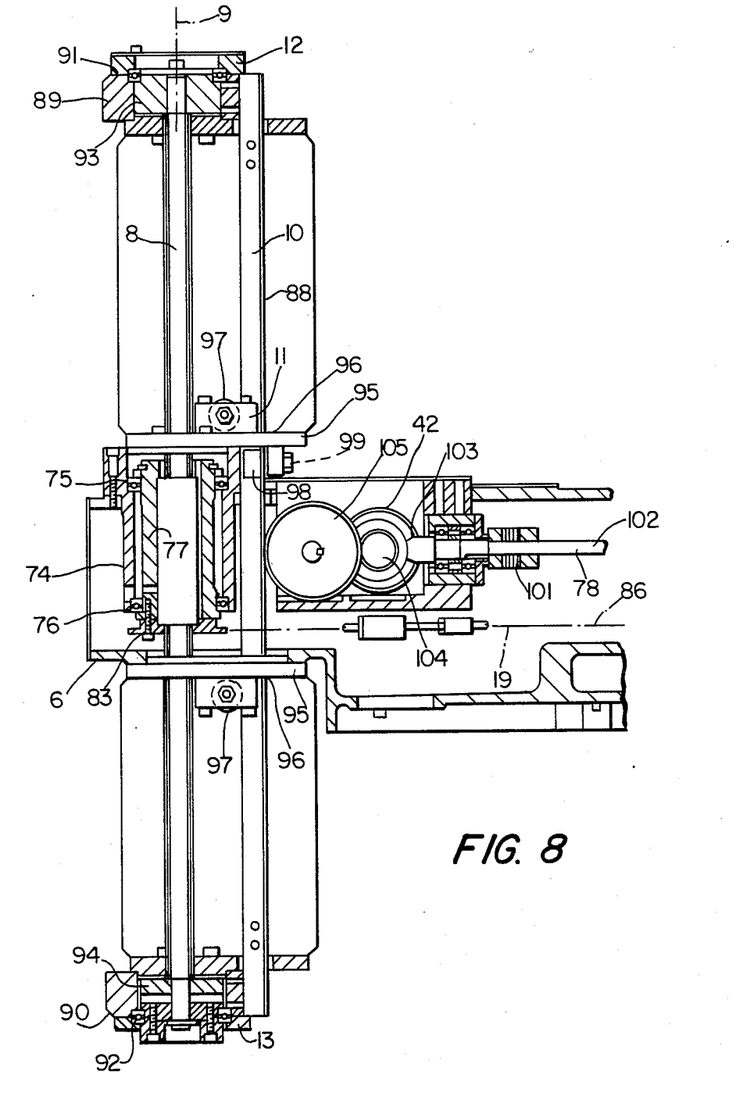
FIG. 8 is a partial cross-sectional view of the frontal portion of the industrial robot as shown in FIG. 3.
Figure 9:
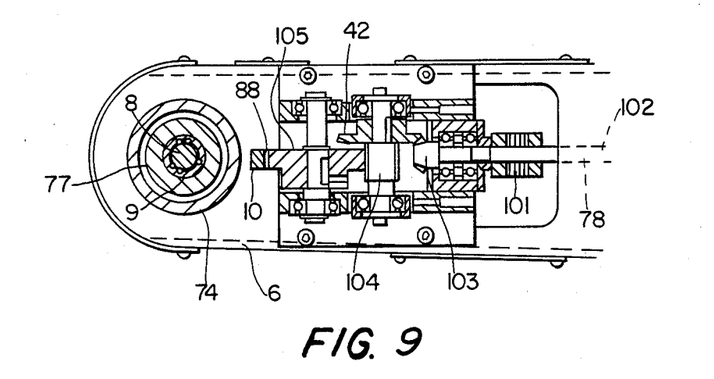
FIG. 9 is a partial plan view of the frontal portion of the industrial robot as shown in FIG. 3.

The second arm 6 is provided with a vertically extending cylindrical seat 74 with the third vertical axis 9 as a center. Inside this seat a boss 77 is supported by the bearings 75, 76 so that it can rotate about the third vertical axis 9. The boss 77 prevents the vertically movable shaft 8 from being turned but allows it to move only in the vertical direction along the third vertical axis 9. The boss 77 is rotated by the fourth drive means 18 via the fourth power transmission means 19. That is, the fourth power transmission means 19 consists of a sprocket 78 secured to the output shaft 43 of the fourth drive means 18, a double sprocket 80 supported by the output shaft 32 through the bearing 79, a double sprocket 82 supported by the pin 60 through the bearing 81, a sprocket 83 secured to the boss 77, and chains 84, 85, 86. The chain 84 is put around the sprockets 78 and 80; the chain 85 is put around the sprockets 80 and 82; and the chain 86 is put around the sprockets 82 and 83. A hole 87 is formed in the connecting wall 28 where the chain 84 passes.

The rack 10 is positioned so that it is parallel to the vertically movable shaft 8 with its teeth side facing the third drive means 17. The connecting means 12, 13 for coupling the rack 10 and the vertically movable shaft 8 comprises rings 89, 90 secured to the rack 10 and bosses 93, 94 supported by the rings 89, 90 through the bearings 91, 92. The bosses 93, 94 are secured to the vertically movable shaft 8.

The rack 10 passes through the hole 96 formed in the support plate 95 which in turn is secured to the second arm 6. The guide means 11 consists of backup roller 97 for supporting the back of the rack 10 and oscillation prevention rollers 98, 99 pressed against both sides of the rack 10. These rollers 97, 98, 99 are supported by the support plate 95 so that they can be rotated.

The third drive means 17 is provided on the side opposite to the third vertical axis 9 with respect to the second vertical axis 7. The fixing portion of the third drive means 17 is secured to the end of the second arm 6 at the height intermediate between the upper and lower lever 56, 57 with its output shaft 42 directed toward the rack 10. The rotation of the output shaft 42 is transmitted to the rack 10 through the third power transmission means 78. That is, the ouptut shaft 42 is so constructed as to drive the pinion bevel gear 103 through two flexible joints 100, 101 and an intermediate shaft 102. The rotation of the bevel gear 103 is converted into a linear movement of the rack 10 through the bevel gear 42, a pinion gear 104 and a spur gear 105, gears 42 and 104 are secured to a common shaft. These gears 42, 103, 104, are supported by the second arm 6. The intermediate shaft 102 runs past near the side of the pin 60.

The second power transmission means 16 can be positioned at the height different from the third drive means.

When the direction of line connecting the vertically movable shaft 8 and the rack 10 is to be kept constant with respect to the ground, the fourth drive means 18 need only be held stopped.

The similar function can be achieved if the fourth drive means 18 is removed and the sprocket 80 is prevented from turning with respect to the shoulder 3.

In this way, the provision of the rack enables the vertically movable shaft to be controlled at high accuracy. Denoted 120 and 121 are position detectors of the first and fourth drive means 14, 18; reference numbers 122 and 123 represent bellows for protecting against dust.

Figure 11:
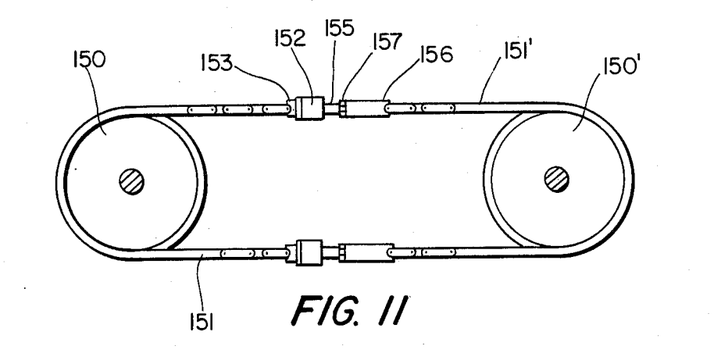
FIG. 11 is a plan view showing the chain tension adjusting mechanism.
Figure 12:
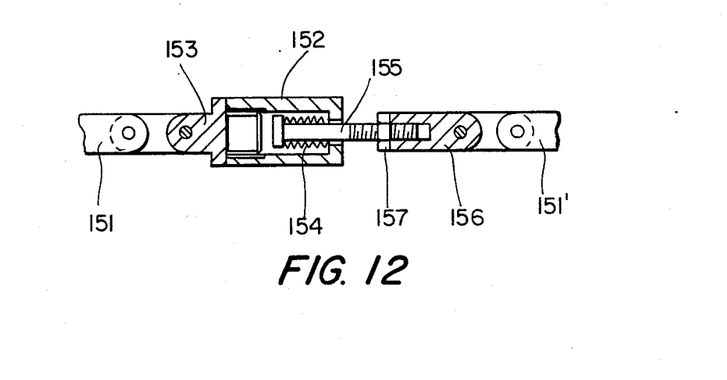
FIG. 12 is a cross-sectional view of the mechanism as shown in FIG. 11.

The reason that the chain and sprocket are used as the power transmission elements in the fourth power transmission means 19 is to facilitate the maintenance. With the endless member such as a timing belt used in the conventional robot of FIG. 1, the rotary shaft components of the robot arm require to be disassembled. But with the chain which is not endless, it can be removed and mounted without disassembling the shaft components. Further a tension adjusting mechanism is provided to the chain, as shown in FIGS. 11 and 12, to give an appropriate tension to the chain and prevent the backlash for smoother rotation of the sprocket and chain.

This is detailed in the following. The chains 151, 151' linking the sprockets 150, 150' are joined together at the center, with the cylinder 152 and the chain 151 coupled by the joint 153. This tension adjusting mechanism also has a bolt 155 which is free to slide in the cylinder 152 and equipped with a compression spring 154, and has an adjust nut 156 connecting the bolt 155 and the end of the other chanin 151' and a lock nut 157 for preventing the bolt 155 from loosening.

In the above tension adjusting mechanism the chains 150, 150' are applied with a tension by the compression spring 154 to remove the backlash of the chains and ensure smoother rotation of the transmission mechanism. The spring constant of the compression spring 154 should be determined based on the hand rotating torque.

As can be seen from the foregoing, the first arm is divided in two and the link mechanism is installed between the divided arms. This construction reduces the base dimension and therefore the space which the robot occupies. Further, since the first arm is divided in the upper and lower parts, a space can be obtained for accommodating the assembled mechanism such as link mechanism and chains. Since the power transmission mechanism is installed inside the arm, high safety can be obtained.

The robot of this invention with two joints has the chain transmission means with a tension adjusting mechanism and also the drive motor. This provides high maintainability of the rotary drive unit for the tool holder shaft and makes easy the switching from the three-degree-freedom robot to the four-degree-freedom robot thus enhancing the cost performance.

Further a construction is employed in which the chain transmission mechanism is not exposed to the outside. This construction prevents human access to the transmission mechanism and thereby improves safety and at the same time prevents dust from attaching to the mechanism.

Furthermore, the robot of this invention having two joints is provided with the chain transmission means for rotating the vertically movable shaft, the drive motor installed on the fixed base, the transmission means for reciprocating the vertically movable shaft, the drive motor and the means for converting the rotary motion into the linear motion. This construction has an advantage that the vertically movable shaft can be stopped at any desired position with high accuracy.

What is claimed is:

1. An industrial robot, comprising:
   a base,
   a first arm having one end mounted pivotally about a first axis on said base,
   a second arm having one end mounted pivotally about a second axis on the other end of said first arm,
   a moving member mounted movably along a third axis on the other end of said second arm,
   first drive means mounted on said base for providing power to said first arm,
   second drive means mounted on said base for providing power to said second arm,
   third drive means mounted on the one end of said second arm for providing power to said moving member,
   first power transmission means for moving said first arm about the first axis by transmitting the power of said first drive means to said first arm,
   second power transmission means for moving said second arm about the second axis by transmitting the power of said second drive means to said second arm, and
   third power transmission means, mounted on the inside of said second arm, for moving said moving member along the third axis by transmitting the power of said third drive means to said moving member.

2. An industrial robot according to claim 1, wherein said first arm has a pair of first and second levers in parallel to form a divided construction, and each of said levers has its opposite ends pivotally mounted to said base and second arm, respectively.

3. An industrial robot according to claim 2, wherein said second power transmission means is mounted on the inside of said first arm.

4. An industrial robot according to claim 3, further comprising:
   fourth drive means mounted on said base for providing power to said moving member, and
   fourth power transmission means for rotating said moving member about the third axis by transmitting the power of said fourth drive means to said moving member.

5. An industrial robot according to claim 4, wherein said fourth power transmission means is mounted on the inside of said first arm and said second arm.

6. An industrial robot according to claim 5, wherein said fourth power transmission means has a chain with two opposed tension adjusting mechanisms so as to rotate smoothly said moving member about the third axis.

7. An industrial robot according to claim 4, wherein said third power transmission means has a rack parallel to the third axis and a gearwheel geared into said rack to precisely drive said moving member along the third axis.

8. An industrial robot according to claim 7, including bellows covering said moving member and a part of said third power transmission means movable with said moving member.

9. An industrial robot according to claim 2, further comprising:
   fourth drive means mounted on said base for providing power to said moving member, and
   fourth power transmission means for rotating said moving member about the third axis by transmitting the power of said fourth drive means to said moving member.

10. An industrial robot according to claim 9, wherein said fourth power transmission means is mounted on the inside of said first arm and said second arm.

11. An industrial robot according to claim 10, wherein said fourth power transmission means has a chain with two opposed tension adjusting mechanisms so as to rotate smoothly said moving member about the third axis.

12. An industrial robot according to claim 9, wherein said base has a pocket formed of a ceiling member, a bottom member and a connecting wall which connects said ceiling member and said bottom member so that said arms can be folded to reduce the volume of the industrial robot.

13. An industrial robot according to claim 9, wherein said third power transmission means has a rack parallel to the third axis and a gearwheel geared into said rack to precisely drive said moving member along the third axis.

14. An industrial robot according to claim 13, including bellows covering said moving member and a part of said third power transmission means movable with said moving member.

15. An industrial robot comprising:
   a base,
   a first arm having one end mounted pivotally about a first axis on said base and a pair of first and second levers to form a divided construction,
   a second arm having one end mounted pivotally about a second axis on the other end of said first arm,
   first drive means mounted on said base for providing power to said first arm,
   second drive means mounted on said base for providing power to said second arm,
   first power transmission means for moving said first arm about the first axis by transmitting the power of said first drive means to said first arm, second power transmission means, mounted in between said first lever and said second lever, for moving said second arm about the second axis by transmitting the power of said second drive means to said second arm, one end of each of said levers is being respectively pivoted to said base at the first axis and the other end of each of said levers being respectively pivoted to said second arm at the second axis, said first lever and said second lever being pivoted to said base and said second arm to be in parallel with each other, said first lever and said second lever being pivoted to said base and said second arm to be spaced apart, a moving member mounted movably along a third axis on the other end of said second arm, third drive means mounted on the one end of said second arm for providing power to said moving member, and third power transmission means for moving said moving member along the third axis by transmitting the power of said third drive means to said moving member.

16. An industrial robot according to claim 15, further comprising:
fourth drive means mounted on said base for providing power to said moving member, and
fourth power transmission means for rotating said moving member about the third axis by transmitting the power of said fourth drive means to said moving member.

17. An industrial robot according to claim 16, wherein said fourth power transmission means has a chain with two tension adjusting mechanisms on opposite sides of said chain to rotate smoothly said moving member about the third axis.

18. An industrial robot according to claim 15, wherein said third power transmission means has a rack parallel to said third axis and a gearwheel geared into said rack to drive precisely said moving member along the third axis.

19. An industrial robot comprising:
a base,
a first arm having one end mounted pivotally about a first axis on said base and a pair of first and second levers to form a divided construction,
a second arm having one end mounted pivotally about a second axis on the other end of said first arm,
first drive means mounted on said base for providing power to said first arm,
second drive means mounted on said base for providing power to said second arm,
first power transmission means for moving said first arm about the first axis by transmitting the power of said first drive means to said first arm,
second power transmission means, mounted in between said first lever and said second lever, for moving said second arm about the second axis by transmitting the power of said second drive means to said second arm,
a moving member mounted movably along a third axis on the other end of said second arm,
third drive means mounted on the one end of said second arm for providing power to said moving member, and
third power transmission means for moving said moving member along the third axis by transmitting the power of said third drive means to said moving member.

20. An industrial robot according to claim 19, wherein said third power transmission means is mounted on the inside of said second arm.

21. An industrial robot according to claim 19, wherein said third power transmission means has a rack parallel to said third axis and a gearwheel geared into said rack to drive precisely said moving member along the third axis.

22. An industrial robot according to claim 19, further comprising:
fourth drive means mounted on said base for providing power to said moving member, and
fourth power transmission means for rotating said moving member about the third axis by transmitting the power of said fourth drive means to said moving member.

23. An industrial robot according to claim 22, wherein said fourth power transmission means has a chain with two tension adjusting mechanisms on opposite sides of said chain to rotate smoothly said moving member about the third axis.

24. An industrial robot according to claim 23, including a bellows covering said moving member and a part of said third power transmission means movable with said moving member.

25. A hand mechanism of a robot, comprising:
a base,
a first member mounted to be translationally movable along a first axis relative to said base,
a second member mounted to be rotatable relative to said first member about a second axis parallel to said first axis,
first drive means for rotating said second member about the second axis and having a driving connection with said second member,
second drive means for moving said first member along the first axis and having a driving connection with said first member,
connection means for connecting said first member and said second member at each of opposite sides of said driving connections so that said second member moves with said first member along said first axis, and
a grip mounted on said second member to be movable in two dimensions.

26. A hand mechanism of a robot according to claim 25, wherein said first member has a rack along said first axis and said second drive means has a gearwheel to translationally drive said first member by engaging said rack.

27. A hand mechanism of a robot according to claim 26, wherein said first drive means has a sprocket, rotatable with said second member and a chain engaging with said sprocket to rotate said second member.

28. A hand mechanism of a robot according to claim 27, wherein said first drive means has two tension adjusting mechanisms on opposite sides of said chain to smoothly rotate said second member about said second axis.

29. A hand mechanism of a robot according to claim 27, further comprising bellows covering said first member and said second member.

30. An industrial robot according to claim 19, wherein one end of each of said levers is respectively overhung pivotally to each of both sides of said base at the first axis and the other end of each of said levers is respectively pivoted to said second arm at the second axis.

31. An industrial robot according to claim 30, wherein the other end of each of said levers is provided at outsides of said second arm and is united by a pin at said second axis.

32. An industrial robot, comprising:
a base,
a first arm having one end mounted pivotally about a first vertical axis on said base,
a second arm having one end mounted pivotally about a second vertical axis on the other end of said first arm,
a first member mounted to be translationally movable along a direction of a third vertical axis on the other end of said second arm,
a second member mounted to be rotatable relative to said first member about said third vertical axis,
first drive means for driving rotatably said first arm, said first drive means having a first drive motor,
second drive means for driving rotatably said second arm, said second drive means having a second drive motor,
a third drive motor mounted on the said second arm for providing power to said first member,
a fourth driving motor mounted on said base for providing power to said second member,
first power transmission means for transmitting the rotating putput power of said third drive motor to said first member so that said second member moves with said first member along said direction of third vertical axis,
second power transmission means for rotating said second member about the third vertical axis by transmitting the rotating output power of said fourth drive motor to said second member, said second transmission means having a boss rotatably supported by a bearing provided on said other end of said second arm and said second member engages with said boss so that the boss prevents said second member form being turned but allows said second member to move only in the direction along said third vertical axis, and
a grip mounted on said second member to be movable in two dimensions.

33. An industrial robot according to claim 32, wherein said first member has a rack along the direction of said third vertical axis and said first transmission means has a gearwheel to translationally move said first member by engaging said rack.

34. An industrial robot according to claim 32, wherein said second transmission means has a sprocket mounted on said boss and a chain engaging with said sprocket and said fourth driving motor.

35. An industrial robot according to claim 34, wherein said second transmission means has two tension adjusting mechanisms on opposite sides of said chain to smoothly rotate said second member about said third vertical axis.

36. An industrial robot according to claim 34, further comprising bellows covering said first member and said second member.

37. An industriall robot according to claim 32, wherein each of said first drive motor, said second drive motor and said fourth drive motor has a speed reducer.

* * * * *